United States Patent [19]

Brunts

[11] Patent Number: 5,724,316

[45] Date of Patent: Mar. 3, 1998

[54] GPS BASED TIME DETERMINING SYSTEM AND METHOD

[75] Inventor: Randall T. Brunts, Carmel, Ind.

[73] Assignee: Delco Electronics Corporation, Kokomo, Ind.

[21] Appl. No.: 533,904

[22] Filed: Sep. 26, 1995

[51] Int. Cl.⁶ .......................... G04B 19/22; G04C 11/02; G08G 1/12; G06F 15/50
[52] U.S. Cl. ................................ 368/10; 368/21; 368/47; 340/988; 364/444.1; 364/449.7
[58] Field of Search ............................ 368/10, 46, 47, 368/21, 22; 340/825.44, 825.26, 825.47, 825.48, 825.49, 990–995, 988; 364/444–452; 342/357, 457; 343/225; 455/12, 51

[56] References Cited

U.S. PATENT DOCUMENTS

| | | |
|---|---|---|
| 4,367,453 | 1/1983 | Kuno et al. |
| 4,642,775 | 2/1987 | Cline et al. |
| 4,646,089 | 2/1987 | Takanabe et al. |
| 4,677,563 | 6/1987 | Itoh et al. |
| 4,681,460 | 7/1987 | Nishimura ............... 368/21 |
| 4,737,927 | 4/1988 | Hanabusa et al. |
| 4,758,959 | 7/1988 | Thoone et al. |
| 4,814,989 | 3/1989 | Döbereiner et al. |
| 4,853,859 | 8/1989 | Morita et al. |
| 4,890,233 | 12/1989 | Ando et al. |
| 4,951,211 | 8/1990 | De Villeroche. |
| 4,954,959 | 9/1990 | Moroto et al. |
| 4,992,947 | 2/1991 | Nimura et al. |
| 5,014,098 | 5/1991 | Schlais et al. |
| 5,014,206 | 5/1991 | Scribner et al. ............... 364/449 |
| 5,068,838 | 11/1991 | Klausner et al. ............... 368/47 |
| 5,072,395 | 12/1991 | Bliss et al. |
| 5,089,814 | 2/1992 | De Luca et al. ............... 340/825.49 |
| 5,146,231 | 9/1992 | Ghaem et al. |
| 5,159,556 | 10/1992 | Schorter. |
| 5,184,303 | 2/1993 | Link. |
| 5,191,532 | 3/1993 | Moroto et al. |
| 5,231,584 | 7/1993 | Nimura et al. |
| 5,257,195 | 10/1993 | Hirata. |
| 5,270,936 | 12/1993 | Fukushima et al. |
| 5,278,759 | 1/1994 | Berra et al. |
| 5,293,513 | 3/1994 | Umezu et al. |
| 5,303,393 | 4/1994 | Noreen et al. |
| 5,319,374 | 6/1994 | Desai et al. ............... 342/387 |
| 5,337,244 | 8/1994 | Nobe et al. |
| 5,343,399 | 8/1994 | Yokoyama et al. |
| 5,345,388 | 9/1994 | Kashiwazaki. |
| 5,353,034 | 10/1994 | Sato et al. |
| 5,359,527 | 10/1994 | Takanabe et al. |
| 5,369,588 | 11/1994 | Hayami et al. ............... 364/449 |
| 5,394,333 | 2/1995 | Kao. |
| 5,398,189 | 3/1995 | Inoue et al. |
| 5,408,444 | 4/1995 | Kita et al. ............... 368/47 |
| 5,412,573 | 5/1995 | Barnea et al. |
| 5,430,653 | 7/1995 | Inoue. |
| 5,442,557 | 8/1995 | Kaneko. |
| 5,452,212 | 9/1995 | Yokoyama et al. |
| 5,452,217 | 9/1995 | Kishi et al. |
| 5,455,807 | 10/1995 | Nepple et al. ............... 368/47 |
| 5,459,667 | 10/1995 | Odagaki et al. |
| 5,486,822 | 1/1996 | Tenmoku et al. |
| 5,515,284 | 5/1996 | Abe. |

*Primary Examiner*—Vit W. Miska
*Attorney, Agent, or Firm*—Jimmy L. Funke

[57] ABSTRACT

An audio entertainment/navigation system with updated time readings is provided especially for a mobile user. The navigation system receives GPS position information signals which are processed to determine current position latitude and longitude coordinates and direction of travel. A destination database includes a plurality of categorized destinations and corresponding destination position coordinates pertaining to the destinations. The destination database is stored on an interfacable memory card. A time change database is also included which contains time-related information such as time zone boundaries and special time change rules such as daylight saving time. The time-related information may be loaded into the system from an interfacable memory card. A time of day as referenced to a reference time and the date are also computed from the GPS signals. The time and date are compared with the time-related information so as to determine a current updated time and date which is used to periodically update the clock and may be displayed on a display. Also, a user may obtain a current time and date reading for a remote destination by entering the destination name or coordinates into the system.

3 Claims, 6 Drawing Sheets

GPS BASED TIME DETERMINING SYSTEM AND METHOD

BACKGROUND OF THE INVENTION

1. Technical Field

This invention relates generally to time indicating devices for providing the time of day and, more particularly, to a GPS based system and method of providing accurate current time readings despite local time changes such as occurs when traveling between time zones.

2. Discussion

The concepts of intelligent vehicle highway systems (IVHS) are changing the future of ground transportation systems. In particular, navigation systems and Mayday Systems have been developed and are increasingly becoming available for use in assisting a mobile user. For example, on-board navigation systems are currently provided in some automotive vehicles to assist the driver of the vehicle in navigating the vehicle along a route or roadway system to reach a desired destination. Also, Mayday Systems are being developed for installation on vehicles as an aid for emergency situations.

Early navigation systems generally did not have the availability of advanced positioning systems such as global positioning system (GPS). Instead, a number of early navigation systems often relied exclusively on dead reckoning techniques to account for a moving vehicle's location. Generally speaking, dead reckoning is the determination of position by advancing a known position using measured courses and distances. This generally involved determining a starting location and manually setting the vehicle's position on an electronic map. With the use of a dead reckoning technique, an approximate path of travel of the vehicle could be computed and updated as the vehicle was driven. The travel path determination was often achieved by way of a compass reading and vehicle speed information or was achieved by some other kind of dead reckoning technique. However, many of the dead reckoning based navigation systems often failed to provide accurate and continuous navigation assistance and therefore required repeated corrections to the vehicle's computed position.

With the widespread availability of GPS, more recent navigation and Mayday systems now rely on GPS to provide position information to compute a vehicle's position. The development of the global positioning system (GPS) by the United States Department of Defense has greatly enhanced the ability to navigate. Currently, a constellation of twenty-four satellites are in place orbiting the earth at high altitudes and transmitting radio waves which contain position information. With the use of GPS receivers, the position information can be received and used to calculate the current latitude and longitude position coordinates at the receiving location. The Global positioning system is currently achieving recognition as the superior position locator system for providing accurate worldwide fixes.

In addition to providing accurate position information, GPS radio wave signals also contain accurate time of day and date (i.e., day of year) information. Based on precise timing of radio propagation times, a GPS-based system can use the four cesium clocks which are currently provided in each of the twenty-four satellites in the constellation to compute the time information. The time and date information is generally computed as a side effect of producing a precise position estimate based on the GPS signal. Currently, the time of day information included with the GPS radio wave signals is referenced to the Greenwich Mean Time (GMT) which is generally recognized as the reference time at the prime meridian.

In the past, navigation systems and various time monitoring systems located on mobile vehicles have generally failed to take into consideration the changes that occur between the various time zones. Generally speaking, time zone changes roughly occur with one hour time changes at approximately 15° longitude intervals that deviate from the meridian. However, the actual time zone boundaries deviate locally from the 15° longitude coordinates lines to follow international and intranational boundaries and due to other local considerations. For example, in the United States the boundaries defining the time zones are fixed by the Department of Transportation and frequently the actual boundaries depart considerably from the 15° longitude meridians. In addition, many countries including the United States advance their time by one hour, particularly during the summer months, into "daylight saving time". These and other time change rules must be taken into consideration when determining the current time at a particular location, especially for mobile users. Accordingly, for navigation systems and Mayday Systems and the like it would be desirable to achieve automatic time determinations for a current location, despite changes in time which occur as one travels across time zones.

It is therefore desirable to provide for a system and method of updating the current time reading to account for changes in time between different time zones.

More particularly, it is desirable to provide a system and method that employs global positioning system signals and a database containing time zone information and provides an accurate current time reading which automatically updates the time reading to adjust for time zone changes.

It is also desirable to provide for a system and method of providing accurate time of day readings for a navigation system or Mayday system for use with a mobile user.

It is further desirable to provide a system and method which may easily be integrated into an audio entertainment system and installed in an automotive vehicle for use in providing updated time information.

Yet, it is also desirable to provide such a system and method which also allows a user to access time readings for remote locations.

SUMMARY OF THE INVENTION

In accordance with the teachings of the present invention, a system and method are provided for realizing accurate current time readings. The system includes a position sensing receiver for receiving GPS radio wave signals containing position and time related information. The position information is processed to determine current position latitude and longitude coordinates. In additional, the system and method determines the time of day from the GPS signals as referenced to a reference time such as GMT. The date is also determined from the GPS signals. The system has a database that contains time zone change rules over a geographic territory so that current time of day as referenced to the reference time can be determined at various position coordinates. A clock is preferably included and the time on the clock is periodically updated with the determined current time of day to provide an accurate time for the current position. The clock time is displayed on a display. In addition, a back-up dead reckoning system provides approximate position information when GPS signals are unavailable.

BRIEF DESCRIPTION OF THE DRAWINGS

Other objects and advantages of the present invention will become apparent to those skilled in the art upon reading the following detailed description and upon reference to the drawings in which.

DETAILED DESCRIPTION OF THE PREFERRED EMBODIMENTS

Figure 1:
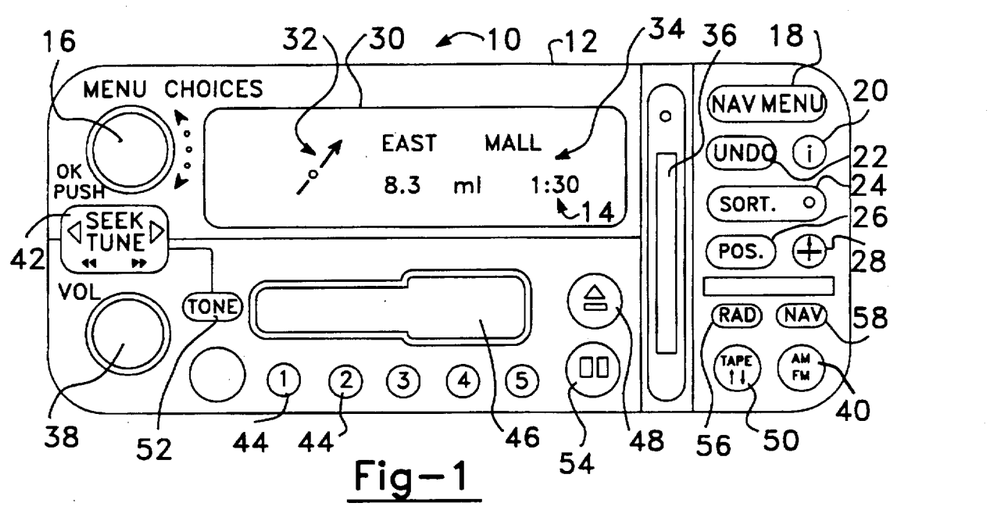
FIG. 1. is a front view of a navigation/audio entertainment system employing a system and method of providing updated time according to the present invention.

Turning now to FIG. 1, a navigation/audio entertainment system 10 equipped with a system and method of determining and updating current time of day is shown therein. The navigation/audio entertainment system 10 of FIG. 1 integrates both a navigation system and an audio entertainment system of the type generally configured for installation in an automotive vehicle. While the embodiment of a navigation/audio entertainment system 10 is shown, the system and method of providing the current time according to the present invention may be applicable for use in any GPS-based system that provides the time of day. Accordingly, an AM/FM radio and/or audio cassette tape player equipped with GPS could employ the present invention. It should also be appreciated that other systems such as Mayday systems, various audio entertainment systems or combinations of audio systems may be used separately or may be combined with the navigation system or other systems. Also, an audio compact disc (CD) player could be employed in addition to or in place of the audio cassette tape player 46 that is shown. It is also conceivable that destination-related information and/or time-related information could be stored on and retrieved from a compact disc or cassette.

The navigation/audio entertainment system 10 is shown integrally packaged with an audio entertainment system. The navigation/audio entertainment system 10 has a face plate 12 which includes the "MENU CHOICES" rotary/pushbutton 16, navigation menu "NAV MENU" pushbutton 18, information "I" pushbutton 20, "UNDO" pushbutton 22, sort by distance "SORT" pushbutton 24, position "POS" pushbutton 26 and current direction heading pushbutton 28. The integrated navigation/audio entertainment system 10 similarly has a guidance display 30 that is commonly shared among the navigation, audio radio and audio cassette tape modes of operation. That is, display 30 will provide the direction indicating arrow 32 with the destination information 34 when in the navigation display mode. However, display 30, when in the audio radio display mode, will generally display AM or FM frequency selections in addition to the time of day and various types of radio related information. When in the audio cassette tape display mode, the display 30 will display information pertaining to the cassette tape operation and the time of day information.

The navigation/audio entertainment system 10 is equipped with a memory card interface 36 for receiving a selected memory card and accessing information stored on the memory card. The stored information on the memory card may include destination-related information and/or time-related information. The memory card is about the size of creditcard and is preferably formatted to PCMCIA standards. The use of PCMCIA standard connections to the card not only helps maintain low costs but also provides other advantages which also will hereinafter be explained.

For navigation purposes, the memory card interface 36 reads destination-related information from a memory card that contains a large number of destinations which are preferably categorized. That is, each destination memory card would contain a selected type of database, as for example a camping information directory, a business directory, a restaurant/hotel directory, etc. for covering a given geographic territory. Each destination memory card provides categorized destinations with corresponding latitude and longitude position coordinates within a predefined territory and may also include alphanumeric text information pertaining to each of the destinations. A more detailed description of the navigation system is discussed in U.S. Pat. application Ser. No. 08/418,931 filed Apr. 7, 1995, entitled "Low Cost Navigation Device with Destination Data Base" and assigned to the assignee of the present invention. The aforementioned patent application is hereby incorporated by reference.

For providing time of day information according to the present invention, the memory card interface 36 is used to retrieve time-related information including time change rules from a time zone memory card. Each time zone memory card contains a set of rules defining time zone boundaries as a function of latitude and longitude position coordinates. In effect, the time-related information data provides a map of the time zones. The programmed rules also include special changes in time such as time changes due to "daylight saving time" and the dates when these changes are in effect. The time change rules covered by a given memory card encompass time change rules for a geographic territory. According to the preferred embodiment, the time change memory card is preferably loaded into the memory card interface 36 and the time-related data is preferably downloaded to memory within the navigation audio entertainment system 10. Accordingly, the time change memory cards may be removed from the memory card interface 36 so that navigation destination cards may be used. Also, data from a plurality of memory card may be downloaded into a larger database in memory within the system 10.

Still further, the PCMCIA memory card could be made with programmable memory that is inherently non-volatile or that has a battery back-up on the memory card. Such a memory card is typically more expensive than the PCMCIA standard card but would offer added flexibility in programming. A user could therefore save destination-related and/or time-related information on such a programmable memory card. One could even program such a programmable PCMCIA memory card with selected destination information and/or time change information on one's personal computer and then use the PCMCIA memory card in an audio/navigation system such as that described herein. Accordingly, use of the PCMCIA memory card for replaceable memory in this invention opens up a myriad of possibilities for types of data bases that might be stored on them for use in the system 10.

The integrated navigation/audio entertainment system 10 is shown also containing various audio radio and cassette tape controls. More particularly, an AM/FM frequency band selection control pushbutton 40 toggles between the AM and FM radio frequency bands. A momentary pushbutton rocker switch 42 provides pushbutton frequency tuning selection and radio frequency seek control. In cooperation with "TONE" pushbutton switch 52, control switch 42 enables selection of various audio sound parameters such as treble, bass, fade, balance and auto volume settings. Five user programmable station preset pushbuttons 44 are available for storing and recalling programmed radio frequency selections from electronically erasable programmable read only memory (EEPROM). Each of the five pushbuttons 44 may access at least three memory locations which, in a radio receiver mode, stores one AM frequency selection frequency and two FM frequency selections.

The integrated navigation/audio entertainment system 10 as shown in FIG. 1 also includes an audio cassette tape player 46. The cassette tape player 46 receives and reads stored audio information on an audio cassette tape (not shown) as is well known in the art. Audio cassette tape player 46 has function controls which include a tape eject pushbutton 48 and a side selector pushbutton 50 for selecting between the first and second sides of an audio cassette tape.

Figure 2:
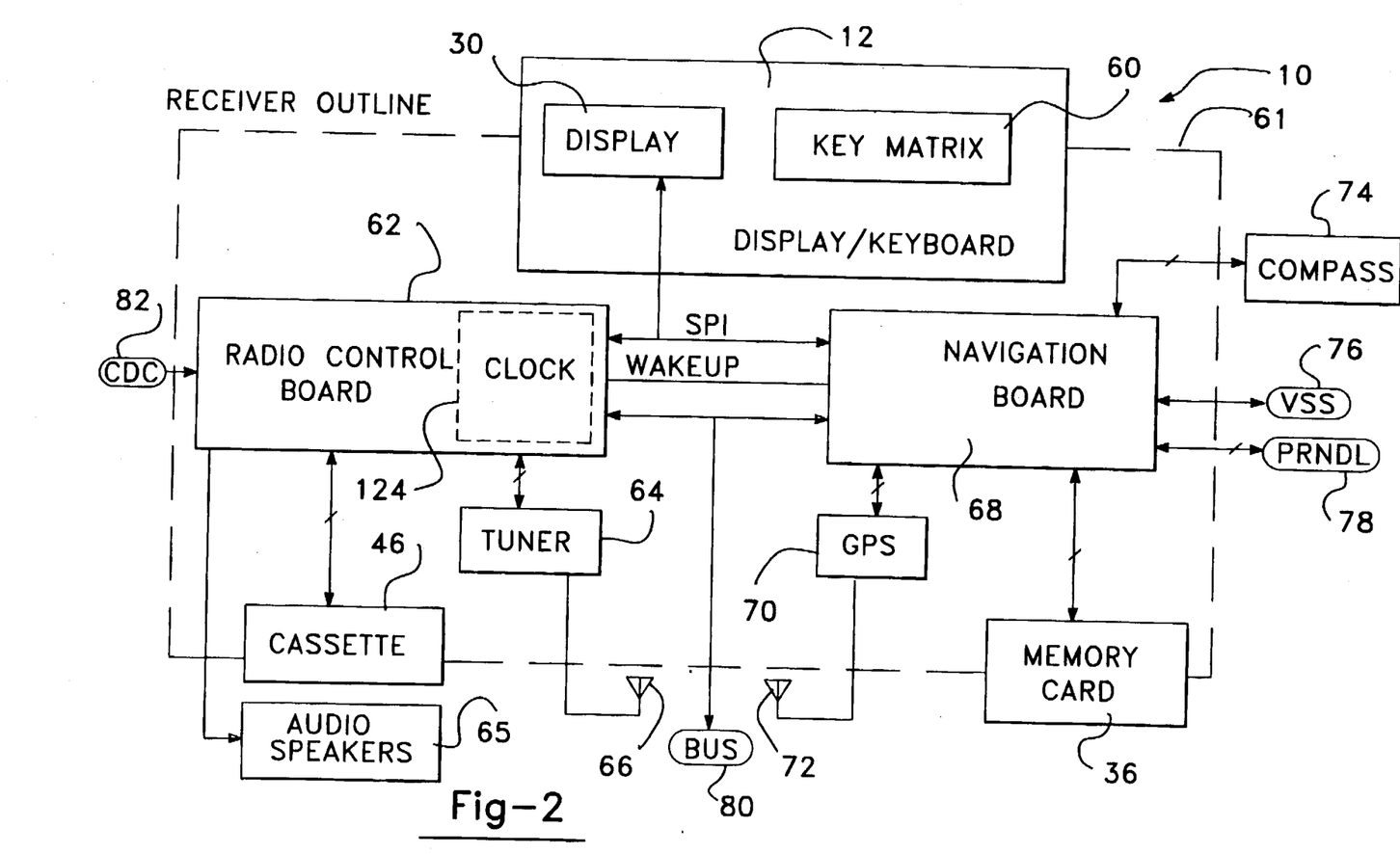
FIG. 2. is a block diagram of the integrated navigation/audio entertainment system shown in FIG. 1.
Figure 3:
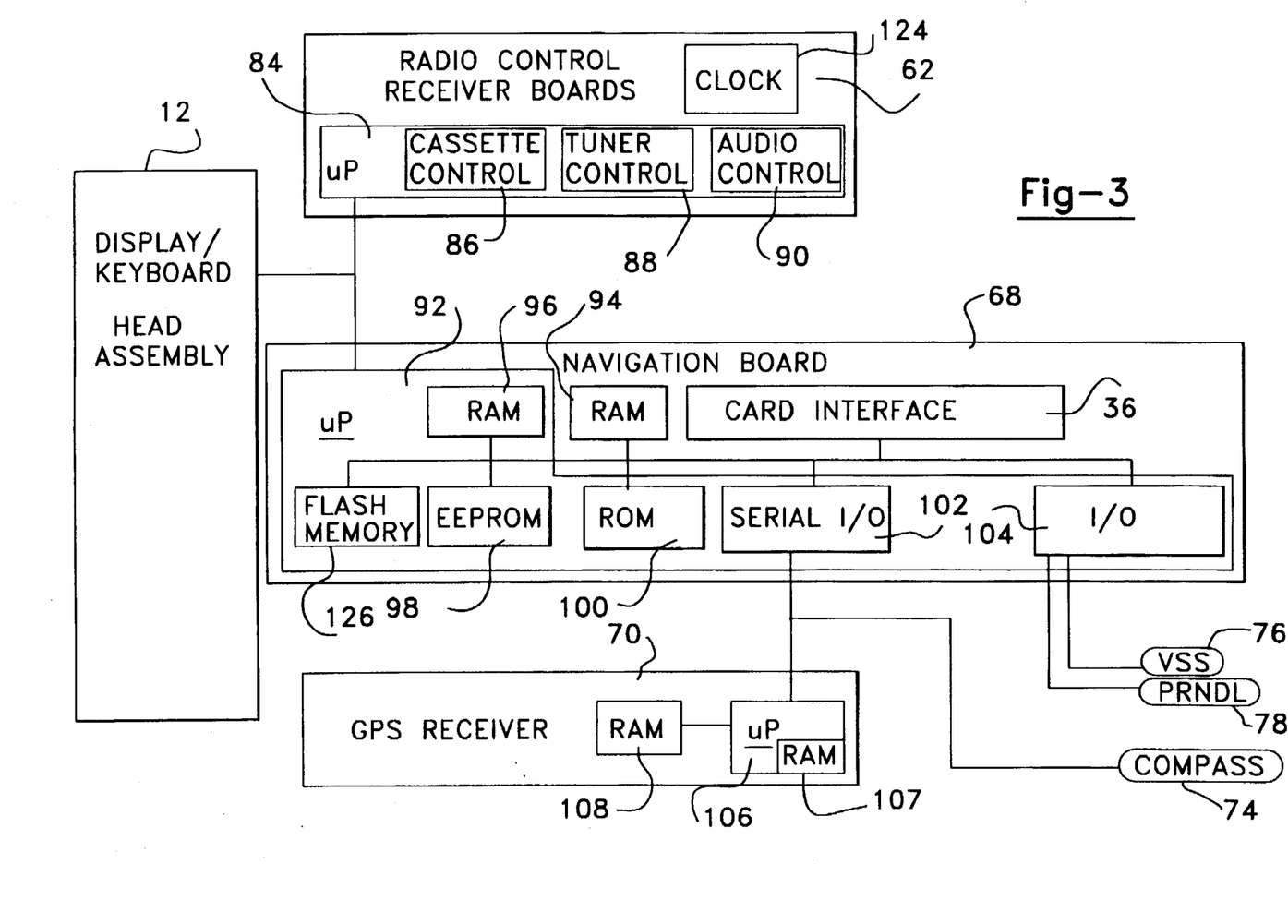
FIG. 3. is a block diagram further illustrating the navigation/audio entertainment system of FIG. 1.

Referring to FIGS. 2 and 3, the navigation/audio entertainment system 10 is further shown to include various interconnected electronics and processing components and signal inputs. As mentioned above, the face plate 12 encompasses shared display 30 and the various user controls as represented by key matrix 60. The housing of system 10 is generally represented by reference numeral 61. Packaged within housing 61 is the audio cassette tape player 46, the memory card interface 36, a radio control board 62 and a navigation board 68. The radio control board 62 is connected to a radio tuner 64 and the audio cassette tape player 46. The radio tuner 64 is further coupled to an externally located radio antenna 66 for receiving radio wave signals. In addition, audio speakers 65 are generally coupled to the radio control board 62.

The radio control board is shown including a clock 124 which contains an internal chronometer, preferably based on a quartz time piece, for measuring time. Clock 124 measures time and is periodically updated with GPS-based time calculations as will be explained herein. Also, clock 124 allows the system to maintain good time estimates when GPS time computations are not available, though accuracy may degrade as the period of GPS outage grows longer, depending on the accuracy of the clock 124. While the clock 124 is shown with the radio control board, it should be appreciated that the clock 124 may be located most anywhere within system 10.

The radio control board 62 communicates with the navigation board 68 via an array of communication lines including SPI and WAKEUP lines. The navigation board 68 is connected to the memory card interface 36 and a GPS receiver 70. The GPS receiver 70, in turn, is connected to a GPS antenna 72. According to well known GPS operations, the GPS receiver 70 receives GPS radio wave signals via the GPS receiving antenna 72. The GPS radio wave signals are emitted from existing GPS satellites. Currently, a constellation of twenty-four known high altitude GPS satellites are in orbit and available to provide continuous worldwide position fixes in all types of weather conditions. The GPS receiver 70 has a built-in processing unit and memory for processing the GPS radio wave signals to determine the latitude and longitude coordinates of the current position, as well as determining the current direction of travel.

More specifically, the GPS receiver 70 continuously receives radio wave signals from the GPS antenna 72 and determines accurate position coordinates which identify the location of the received signals. This determination includes calculating the distance from various satellites to determine a location relative thereto. By measuring the current signals sent by the GPS satellites and knowing orbital parameters of the satellites, the GPS receiver 70 is able to determine the location thereof and generate longitude and latitude position coordinates identifying the position of the received signals.

More particularly, with the received GPS signals, the latitude and=longitude position coordinates of the GPS receiver 70 are determined by computing distance from each of several GPS satellites currently visible to the receiver 70 by direct line-of-sight. Distance is determined by precise computation of the time required for radio signals to travel from the GPS satellite to the GPS receiver 70. Combined with precise information about the satellites' positions relative to the earth, precise latitude and longitude coordinates are computed.

In addition to determining precise latitude and longitude position coordinates, the GPS receiver 70 also computes an accurate time of day and date from the GPS radio wave signals. The GPS receiver 70 receives signals from four satellites and solves for travel time which is used to compute distance from the satellites to the receiver. The radio wave information is commonly encoded in a spread spectrum transmission. Accordingly, the time of day and date information is computed as a byproduct of solving for the location, since time is included in the pulses of information.

At speeds greater than a few miles per hour, the GPS receiver 70 can also determine a precise direction of travel. The receiver 70 determines rate of change in range or relative speed to each visible satellite. Combined with precise knowledge of satellite orbits and the earth's rotation, the ground velocity (i.e., speed and direction) of the GPS receiver 70 can be precisely determined. The determined direction heading is preferably used as a reference while the vehicle is moving at a speed of greater than five miles per hour, for example.

GPS is widely known and should be understood to those skilled in the art as a means for providing accurate position location information with an accuracy within one-hundred (100) meters or better for over ninety-five percent (95%) of the time. It should also be understood that enhanced accuracy may be obtained with GPS now and in the future. For example, a differential receiver could also be employed to provide the availability of differential GPS which offers enhanced position determining accuracy.

The navigation board 68 receives a number of signal inputs which include a signal indicative of the vehicle direction heading as generated by a magnetic flux gate compass 74 according to one embodiment. According to a second embodiment, the direction heading signal may alternately be generated with a gyro compass. The gyro compass offers the advantage of immunity to magnetic noise such as is common in urban environments and near power distribution centers. Accordingly, the gyro compass may be more desirable when GPS blockages combined with high magnetic noise levels can be expected. The direction heading indication provided by compass 74 is used as back-up heading information which serves as a reference for determining straight-line direction to a selected destination when the vehicle's speed drops below five miles per hour. The direction heading signal from compass 74 is also used with the back-up dead reckoning system when GPS is unavailable.

Additionally, a vehicle speed sensor(VSS) signal 76 is received by the navigation board 68 to provide an indication of vehicle speed. Also received by the navigation board 68 is a transmission position (PRNDL) signal 78 which provides an indication of a forward or reverse direction of travel of the vehicle. Together, the direction heading signal provided by a compass 74, as well as the vehicle speed sensor signal 76 and transmission position signal 78 allow for the backup dead-reckoning system to complement the GPS position coordinates.

With particular reference to FIG. 3, the radio control receiver board 62 is shown to contain a microprocessor 84. The radio control receiver board 62 is also equipped with some type of memory such as EEPROM (not shown). The radio control microprocessor 84 generally handles the audio entertainment controls. For instance, microprocessor 84 functions as an audio cassette tape control 86 for controlling the audio cassette tape player 46. In addition, microprocessor 84 also operates as a tuner control 88 and an audio control 90 for controlling the audio radio and sound operations as should be evident to one skilled in the art.

The navigation board 68 also contains its own navigation control microprocessor 92 for controlling the primary navigation functions of the present invention. The microprocessor 92 has built-in random access memory (RAM), flash memory 126, electronically erasable programmable memory (EEPROM) 98, read only memory (ROM) 100, a serial input/output 102 and an input/output 104. The EEPROM 98 and ROM 100 generally contain the necessary programmed instructions for performing the primary calculations to determine distance and direction to selected destinations. Also included on the navigation board 68 is random access memory (RAM) 94 and the memory card interface 36. The random access memory (RAM) 96 or 94 preferably contains programmable memory locations for storing destination information and for continually storing variables used to determine the direction and distance information as processed by the navigation control microprocessor 92. The flash memory 126 preferably contains the downloaded time-related information from one or more time change memory cards and includes the time zone change rules.

The GPS receiver 70 also includes a built-in GPS control microprocessor 106 and random access memory (RAM) 108. Microprocessor 106 also contains built-in random access memory (RAM) 107. The random access memory (RAM) 107 or 108 preferably stores the radio wave signals received from the GPS receiving antenna 72 for processing. The GPS control microprocessor 106 processes the received radio wave signals and calculates the current latitude and longitude position coordinates thereof in addition to computing the current time of day and date and calculating the current direction of travel. The calculated position coordinates, time, date and direction data may thereafter be stored in RAM 107 or 108.

Figure 4:
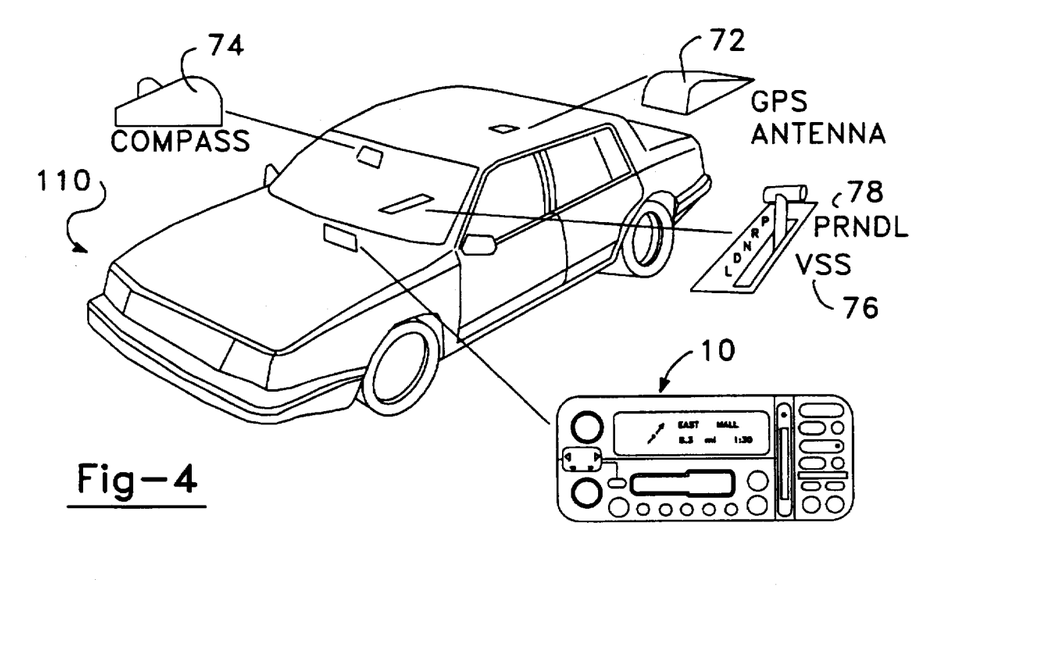
FIG. 4. is a view of an automotive vehicle equipped with the system and method of the present invention.

According to a preferred embodiment, the system 10 may easily be mounted in an automotive vehicle 110 as shown in FIG. 4. According to the automotive vehicle application, the navigation system 10 may easily be mounted within the dash of the vehicle 110 in a manner similar to the mounting of a car radio. Accordingly, the key matrix 60 and display 30 are easily accessible by the driver or a passenger in the vehicle 110. The magnetic flux compass 74 is located near the upper midportion of the windshield near or within the rearview mirror assembly. The vehicle speed sensor (VSS) signal 76 and transmission position (PRNDL) signal 78 are taken from the vehicle transmission. The GPS antenna 72 is preferably mounted on the roof of the vehicle 110 and exposed to GPS radio wave signals.

Figure 5:
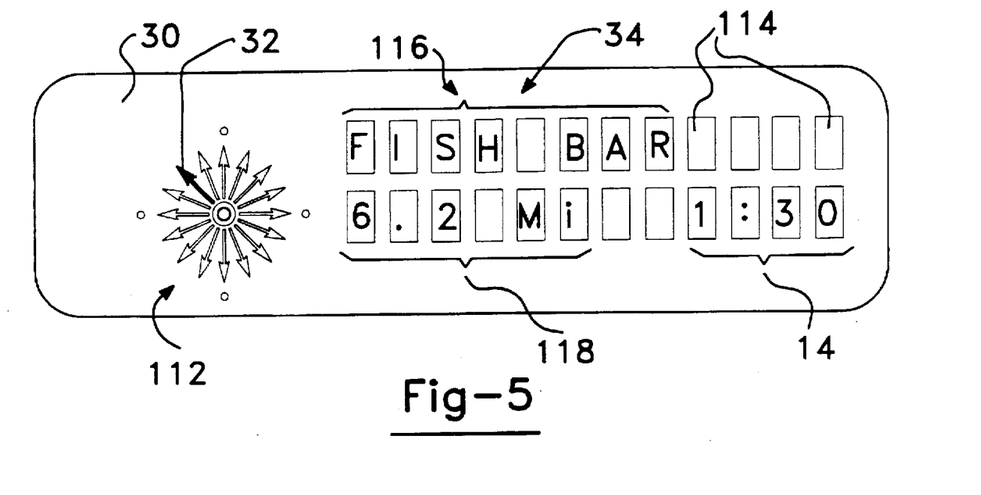
FIG. 5. is a schematic view of display graphics for displaying time of day.

With particular reference to FIG. 5, the display 30 is shown in an enlarged schematic view. The display 30 is a simplistic and inexpensive alphanumeric text with direction pointing arrow display. According to one embodiment, display 30 is a vacuum fluorescent (VF) display. Alternately, display 30 may include a liquid crystal display (LCD) equipped with back-lighting. It should be appreciated that various types of displays can be used to display the time of day reading.

The display 30 shown includes a direction pointing arrow display 112 containing a plurality of equi-angular direction pointing arrows such as arrow 32. According to the embodiment shown, direction pointing display 112 includes sixteen possible arrow selections equi-angularly displaced 22.5_ about a 360_ rotation. The appropriate direction pointing arrow such as arrow 32 is selected and actively displayed as a darkened arrow to provide an indication of the straight-line direction from the current position of the GPS receiver 70 to a selected destination. The arrow direction may vary and is determined by the calculated direction as referenced to the current vehicle heading provided by the GPS receiver 70 or backup compass 74. The direction pointing arrow 32 pointing upward indicates that the destination is directly ahead of the vehicle, while the direction pointing arrow 32 pointing downward indicates that the destination is directly behind the vehicle. The direction pointing arrow 32 pointing to the right indicates that the destination is to the right and that the driver of the vehicle may turn the vehicle when appropriate. Likewise, the direction pointing arrow 32 pointing to the left indicates that the destination is to the left.

The navigation display 30 further includes alphanumeric character displays 114 for displaying alphanumeric characters. Character displays 114 each preferably include an array of segments, pixels or a dot matrix for economically displaying alphanumeric characters such as individual alphabetical, numeric or other symbolic characters. The display 30 is equipped with a limited number of character displays 114. As shown, a total of twenty-four character displays 114 are divided between a top line and a bottom line of text. The text information 34 may include various menu categories, sub-categories, destinations, distance information, and a wide variety of alphabetical, numerical and text information. As shown in FIG. 5, a destination name 116 is provided on the top line. Displayed on the bottom line is a distance as determined from the current position to the selected destination. While the distance shown is displayed in miles, the metric equivalent of the distance in kilometers (km) could likewise alternately be displayed. Also, displayed on the bottom line is a digital reading of the time of day as measured by clock 124 and updated as described herein. While the time shown includes the hour and minutes, seconds and split seconds could also be displayed. Furthermore, the computed date could also be displayed.

Figure 6:
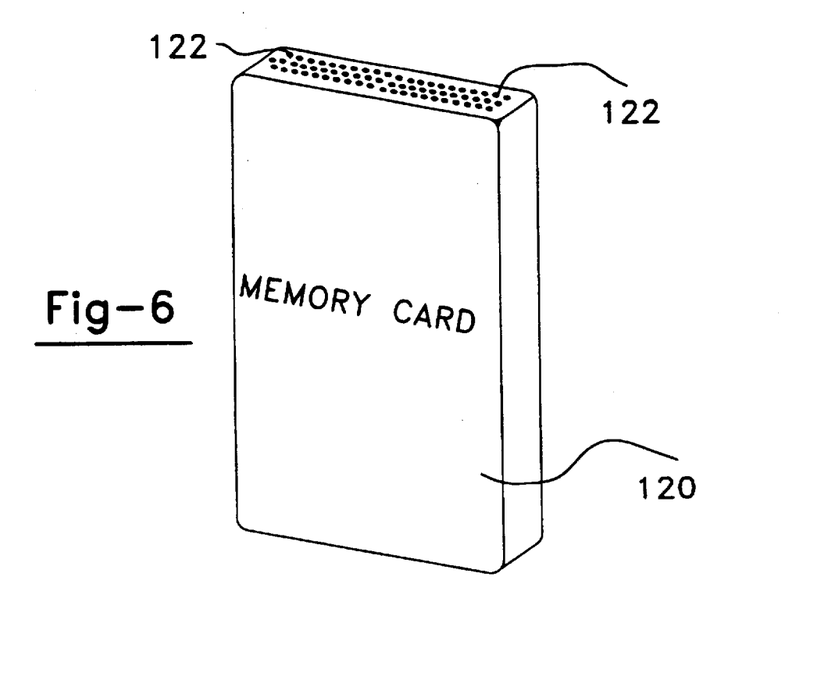
FIG. 6. illustrates a readable PCMCIA standard memory card containing time change information for a geographic territory.

Referring to FIG. 6, a preferred memory card 120 that can be used to provide the destination data base and/or time-related information is shown therein. According to one embodiment, the memory card 120 is formatted to PCMCIA standards and contains information that is stored on read only memory (ROM) or programmable memory within the memory card 120. One example of the PCMCIA memory card 120 is Model No. FE02M-20-10038-01 manufactured and sold by Centennial Technologies, inc. This particular memory card 120 has a PCMCIA standard interface which includes a total of sixty-four female electrical connector holes 122 provided at the connector end for receiving pin connectors within the memory card interface 36. It should be appreciated that a plurality of memory cards 120 may be selected from to access destination-related and time-related information that is made available for a predefined geographic territory.

Figure 7:
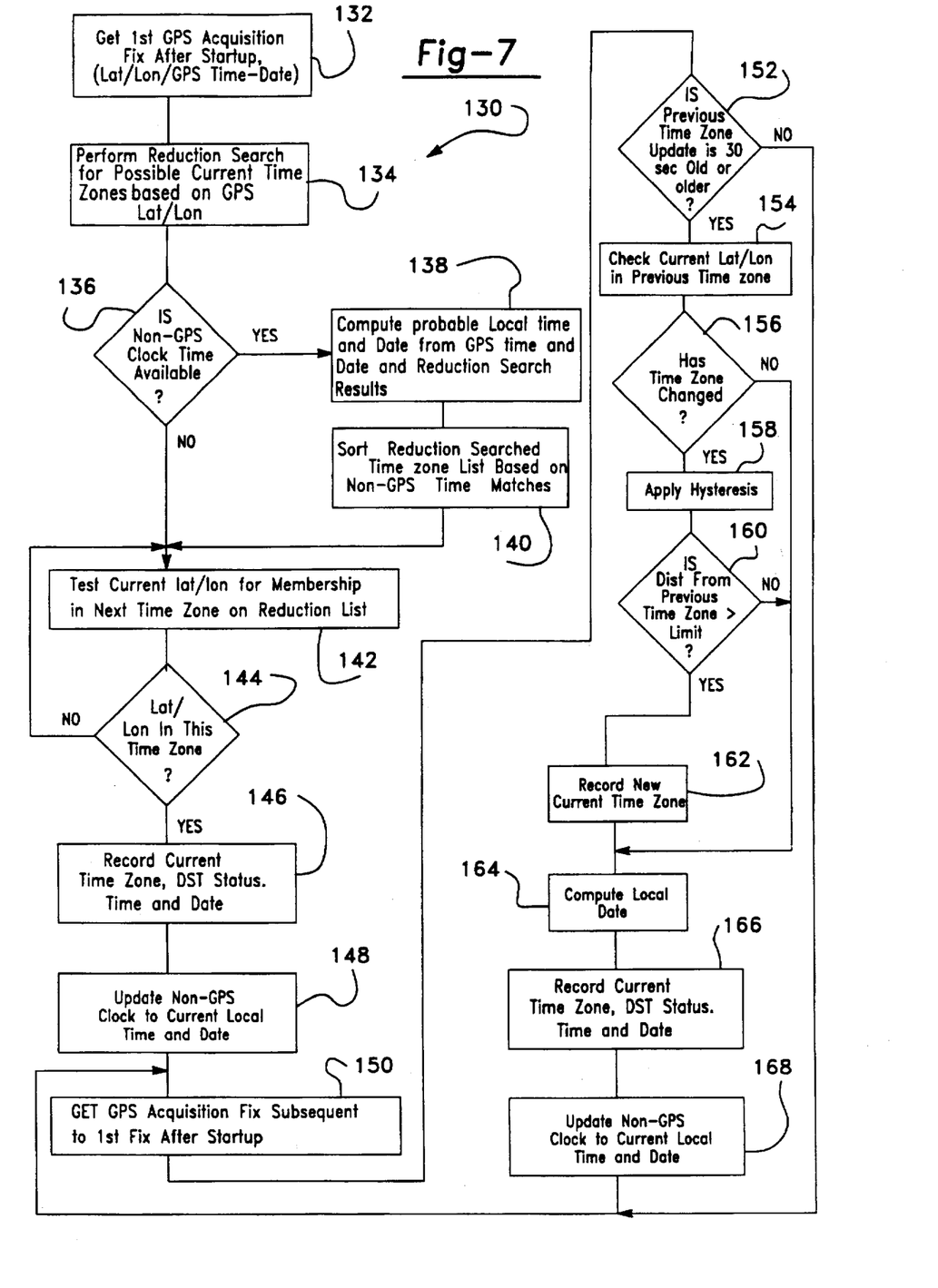
FIG. 7. is a flow diagram illustrating a method of computing precise time information according to the present invention.

With particular reference to FIG. 7, a methodology 130 for determining and updating the time of day and date in accordance with the present invention is shown therein. The methodology 130 begins at block 132 with acquisition of the first GPS fix after system start-up. This generally includes acquisition of latitude and longitude position coordinates and GPS time and date. Once the first GPS data is acquired, a reduction search for possible current time zones based on the GPS latitude and longitude position coordinates is performed as provided in step 134. The reduction search generates a list of selected time zone regions which the receiver is more likely to be in. The methodology 130 then checks to see if the non-GPS clock time is available in step 136. The non-GPS clock time is the time provided by the internal clock 124. If non-GPS clock time is available, step 138 computes a probable local time and date from GPS time and date and the reduction search results. Thereafter, in step 140, the reduction search time zone list is sorted based on non-GPS time matches. Next, the current latitude and longitude position coordinates are tested for membership in the next time zone on the reduction list pursuant to step 142. Similarly, if non-GPS clock time is not available as determined in step 136, the current latitude and longitude position coordinates are tested for membership in the next time zone in step 142. Step 144 checks to see if the latitude and longitude position coordinates are in the currently compared time zone and, if not, steps 142 and 144 are repeated. Otherwise, the current time zone, daylight saving time (DST) status, current time of day and date information are recorded pursuant to step 146. The non-GPS clock 124 is updated to the current local time and date in step 148. Accordingly, the internal clock 124 is thus far updated to the current time and date for the current position as the first update since start-up of the GPS-based system.

Once the GPS time and date information has been determined for the current position and updated on the clock 124 for the first time since GPS start-up, the methodology 130 proceeds to a loop beginning at step 150. At step 150, a GPS acquisition fix is obtained subsequent to the first fix after start-up. Next, the methodology 130 checks to see if the previous time zone update is thirty seconds old or older pursuant to step 152. If a thirty second time interval has not elapsed since the previous time zone update, the methodology 130 returns to step 150 to acquire another GPS fix. This provides for a periodic time zone update of approximately thirty seconds, according to one example. That is, time zone changes, and changes in time and date will not be made to the clock 124 other than at periodic thirty second intervals.

Once the thirty second time period has elapsed, methodology 130 will proceed to step 154 to check the current latitude and longitude position coordinates in the previous time zone. Step 156 will then check to see if the time zone has changed and, if so, will proceed to update the time in accordance with the time zone change. To do so, the methodology proceeds to step 158 to apply hysteresis and to step 160 to check if the distance from the previous time zone is greater than a preselected distance. The preselected distance may, for example, be arbitrarily selected as one-tenth of a mile. The predetermined distance with hysteresis insures that the time reading bordering a time zone change will not flip flop due to any variance or error in the GPS signals.

Referring to step 160, if the distance from the previous time zone is greater than the predetermined distance, the new current time zone is recorded in step 162. Next, the local date is computed pursuant to step 164. Referring back to step 156, if no time zone change has occurred, the methodology 130 would similarly proceed to step 164 to compute the local date. From step 164, the methodology 130 will then proceed to record the current time zone, daylight saving time status, current time of day and date information provided in step 166. Finally, the non-GPS clock is updated to the current local time and date and the methodology 130 returns to step 150 to obtain another GPS acquisition fix.

Figure 8:
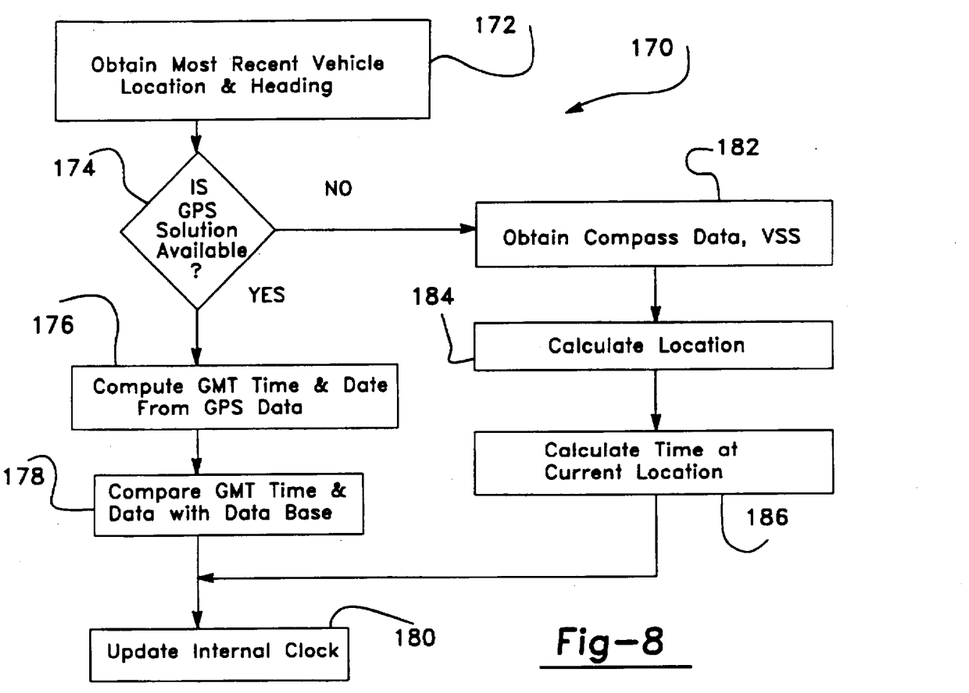
FIG. 8. is a flow diagram illustrating a method of continuously computing time despite a GPS fade scenario.

The system and method of the present invention is also able to provide time and date information when GPS solutions are unavailable as provided in the methodology 170 of FIG. 8. Methodology 170 begins with step 172 in which the most recent vehicle location and heading information is obtained. Proceeding to step 174, methodology 170 checks to see if the GPS solution is available. If GPS is available, the reference or GMT time and date is computed from the GPS data as provided in step 176. The computed GMT time and date is then compared with the data base as provided in step 178. Thereafter, the internal clock 124 is updated pursuant to step 180.

Referring again to step 174, if the GPS solution is not available, methodology 170 proceeds to step 182 in which the compass data and vehicle speed sensor information is obtained. When the GPS solution is not available, the new location is calculated from the old location and the compass data and vehicle speed sensor information as provided in step 184. With the dead reckoning sensor information, given the vehicle speed sensor signal 76, the transmission position signal 78, compass reading 74 and time related information, the navigation board microprocessor 92 is able to determine an approximate expected location of the mobile user, despite the unavailability of GPS signals. Currently, existing global positioning systems have been known to suffer from signal blockage caused by tall buildings and other interferences. When the GPS signal is unavailable, the present invention takes into account for any such interferences and enables the navigation system 10 to continue to operate despite the occurrence of GPS interference or other causes of unavailability of GPS. For example, in a typical urban environment, a vehicle may travel a roadway system between various tall buildings in which the GPS radio wave signals may be blocked by an obstruction caused by nearby buildings. This interference condition is known as the occurrence of GPS fade. In order to handle the GPS fade scenario, the navigation system 10 advantageously stores the last set of position coordinates and calculated speed and direction information, in addition to the time the last position coordinates were recorded. Proceeding to step 186, the time at the current calculated location is then determined and the internal clock 124 is updated pursuant to step 180.

Figure 9:
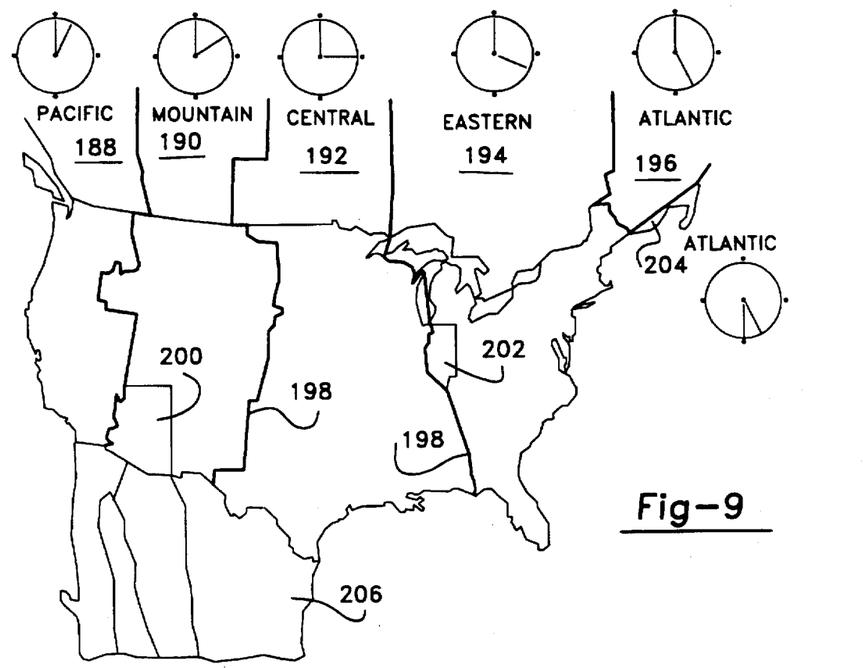
FIG. 9. is a map illustrating some examples of currently existing time zone changes in the United States which may be accounted for with the present invention.

FIG. 9 illustrates a geographic territory covering the mainland of the United States to show how a user may employ the system and method of the present invention to account for time changes between time zones. As one travels from the West Coast to the East Coast and beyond, a mobile user may cover five different time zones represented by Pacific time zone 188, Mountain time zone 190, Central time zone 192, Eastern time zone 194 and Atlantic time zone 196, each generally having one hour time differences. These time zones are divided by time zone boundaries 198 which vary locally as generally shown. In addition, other special time zone rules are accounted for. For example, boundaries 200, 202 and 206 generally define territories which do not follow Daylight Savings Time (DST). Another special rule applies to boundary 204 which is one-half hour ahead of the Atlantic time zone 196. With the use of the system and method of the present invention, a mobile user is able to travel across the time zone boundaries 198 through 206 from one time zone to another and realize the current updated time of day and date readings for the current position of the user. Accordingly, the time and date readings takes into consideration the time zone changes and daylight saving time.

Furthermore, with the use of the navigation system 10, a user may call up a particular destination or may enter latitude and longitude position coordinates for a particular destination and obtain a reading of the time of day and date at that requested destination. This may include entering the destination name or coordinates in degrees/minutes/seconds in a form such as 40_30'29.2N, as an example. To enter coordinate information, the user easily rotates the menu choices rotary pushbutton switch 16 to sequence through alphanumeric characters which are sequentially displayed on display 30. When a desired alphanumeric character is displayed, the user may depress the rotary pushbutton switch 16 to select the displayed character. Continued rotary sequencing and depression of the rotary pushbutton switch 16 is repeated so as to sequentially select the next characters until the latitude and longitude position coordinates are entered in. Remote time readings may be accomplished by a user in the eastern standard time zone 194 entering position coordinates for a destination in the Pacific standard time zone 188 in order to find out the current time of day and date at the entered destination which is three hours different from the time of day in the eastern standard time zone 194 where the user may currently be located. These and other uses of the system and method of the present invention may be realized as should be evident to one skilled in the art.

While this invention has been disclosed in connection with a particular example thereof, no limitation is intended thereby except as defined in the following claims. This is because a skilled practitioner recognizes that other modifications can be made without departing from the spirit of this invention after studying the specification and drawings.

What is claimed is:

1. A method of providing current updated time of day, said method comprising the steps of:

receiving GPS radio wave signals;

determining a current position from said GPS radio wave signals;

determining a reference time of day from said GPS radio wave signals;

providing a clock for providing a measured time;

determining a direction of travel;

determining a speed of travel;

determining an approximate current position as a function of the determined direction and speed of travel when GPS radio waves are unavailable;

determining the current time of day as a function of the approximate current position; and displaying the determined current time of day.

2. In a GPS navigation and audio entertainment system having navigation control means, display means, a GPS receiver for receiving GPS radio wave signals and processing means for determining a current position, the improvement comprising:

means for determining a reference time of day of said received GPS radio wave signals;

a data base containing time-related information including time zone position boundaries mapped as a function of geographical position coordinates, said time-related information further including rules for defining changes in time;

a clock for providing a measured time of day;

means for determining a direction of travel;

means for determining a speed of travel;

means for calculating an approximate current position as a function of the determined direction and speed of travel when GPS radio wave signals are unavailable and calculating the current time of day for the approximate current position; and means for periodically updating the clock with the calculated current time of day.

3. A navigation system for use in a vehicle and having a clock which is automatically updated with a measured time of day based on time change boundaries, the system comprising:

a radio wave receiver for receiving a position indicative signal and a reference time;

means for determining a current position of the vehicle from the radio wave signal;

memory containing time-related information including time zone position boundaries mapped as a function of geographical position coordinates, said time-related information further including rules for defining changes in time as a function of the geographical position coordinates;

a clock for providing a measured time of day;

means for determining a direction of travel;

means for determining a speed of travel;

means for calculating an approximate current position as a function of the determined direction and speed of travel when GPS radio wave signals are unavailable and calculating the current time of day for the approximate current position; and means for periodically updating the clock with the calculated current updated time of day.

* * * * *